US007817186B2

(12) United States Patent
Tamamura

(10) Patent No.: US 7,817,186 B2
(45) Date of Patent: Oct. 19, 2010

(54) CAMERA AND IMAGE PROCESSING METHOD FOR SYNTHESIZING PLURAL IMAGES FORMING ONE IMAGE GROUP TO GENERATE A SYNTHESIZED IMAGE

(75) Inventor: Hideo Tamamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 394 days.

(21) Appl. No.: 11/721,477

(22) PCT Filed: Dec. 13, 2005

(86) PCT No.: PCT/JP2005/023206

§ 371 (c)(1),
(2), (4) Date: Jun. 12, 2007

(87) PCT Pub. No.: WO2006/064936

PCT Pub. Date: Jun. 22, 2006

(65) Prior Publication Data

US 2008/0136939 A1    Jun. 12, 2008

(30) Foreign Application Priority Data

Dec. 13, 2004   (JP)   ............................. 2004-360241

(51) Int. Cl.
*H04N 5/228* (2006.01)
*H04N 5/222* (2006.01)
(52) U.S. Cl. .............................. 348/208.12; 348/333.11
(58) Field of Classification Search ...............................
348/208.12–208.16, 333.01, 333.05, 333.11, 348/333.12, 218.1
See application file for complete search history.

(56) References Cited

U.S. PATENT DOCUMENTS

| 7,239,342 B2* | 7/2007 | Kingetsu et al. ......... 348/208.4 |
| 7,295,232 B2* | 11/2007 | Washisu ..................... 348/239 |
| 2003/0117518 A1* | 6/2003 | Pyle ........................... 348/364 |
| 2004/0150738 A1* | 8/2004 | Sakimoto et al. ....... 348/333.11 |
| 2004/0160525 A1 | 8/2004 | Kingetsu et al. |
| 2004/0196376 A1* | 10/2004 | Hosoda et al. .......... 348/207.1 |
| 2004/0238718 A1 | 12/2004 | Washisu |

FOREIGN PATENT DOCUMENTS

| EP | 0987885 A2 | 3/2000 |
| JP | 2000-092378 | 3/2000 |
| JP | 2000-224470 A | 8/2000 |
| JP | 2000-307921 | 11/2000 |
| JP | 2000-341577 | 12/2000 |

(Continued)

OTHER PUBLICATIONS

International Search Report issued on Apr. 4, 2006 for International Application No. PCT/JP2005/023206.

(Continued)

*Primary Examiner*—Justin P Misleh
(74) *Attorney, Agent, or Firm*—Cowan, Liebowitz & Latman, P.C.

(57) ABSTRACT

A camera includes an image taking system for taking plural images to be synthesized into a first image for recording use, and an image generator for generating a second image for display use by image-processing a specific image among the plural images.

15 Claims, 5 Drawing Sheets

FOREIGN PATENT DOCUMENTS

| | | |
|---|---|---|
| JP | 2003-069897 A | 3/2003 |
| JP | 2004-260859 A | 9/2004 |

OTHER PUBLICATIONS

All of the above references were cited in a May 4, 2009 Extended European Search Report of the counterpart European Patent Application No. 05816683.6.

English translation of Chinese Office Action, for application No. 200580042635.7 dated May 9, 2008.

The above reference was cited in a Nov. 4, 2009 Japanese Office Action that issued in Japanese Patent Application No. 2004-360241, which is not enclosed.

\* cited by examiner

CAMERA AND IMAGE PROCESSING METHOD FOR SYNTHESIZING PLURAL IMAGES FORMING ONE IMAGE GROUP TO GENERATE A SYNTHESIZED IMAGE

TECHNICAL FIELD

The present invention relates to a camera, such as a digital camera.

BACKGROUND ART

Important processes for photographing are so automated in conventional cameras that amateur camera operators are unlikely to fail in photographing.

More recently, a system that compensates shakes during photographing has been studied. For example, a known system detects user's shakes in the camera, moves a lens in synchronization with the shake, and forms a less vibratory image even with a long exposure time period.

Japanese Patent Application, Publication No. 2000-341577 discloses a method of taking plural images that run short of exposure at such a fast shutter speed that no shake occurs, and synthesizes them into a less oscillatory, properly exposed image.

Most of the recent digital cameras serve to display a taken image on a liquid crystal display ("LCD") on a back surface of the camera for each shot, and display plural thumbnails on the LCD so that a user can select an image to be reproduced among plural taken images.

However, the camera disclosed in the prior art has the following problem: In generating one properly exposed image by synthesizing plural images that are taken with insufficient exposure at such a fast shutter speed that is less subject to camera shakes, a position coordinate of each image is calculated and the images are synthesized based on a shake amount obtained by the shake detecting function. Thus, it takes a long time to display the resultant synthesized image on the LCD, interrupting shooting and losing the best moment to take a good picture in the next shot.

On the other hand, an attempt to display a pre-synthesized image runs with insufficient exposure results in a display of such a dark image that the user has a difficulty in recognizing a composition.

DISCLOSURE OF INVENTION

The present invention is directed to a camera that does not interrupt photography and can properly display a taken image in generating one exposed image from synthesizing plural images.

A camera according to one aspect of the present invention includes an image taking system for taking plural images to be synthesized into a first image for recording use, and an image generator for generating a second image for display use by image-processing a specific image among the plural images.

An image processing program according to another aspect of the present invention runs in a computer included in a camera includes the steps of taking plural images to be synthesized to generate a first image for recording use, and generating a second image for display use by image-processing a specific image among the plural images.

Other objects and further features of the present invention will become readily apparent from the following description of the embodiments with reference to accompanying drawings.

BEST MODE FOR CARRYING OUT THE INVENTION

Referring now to the accompanying drawings, a description will be given of preferred embodiments according to the present invention.

Figure 1:
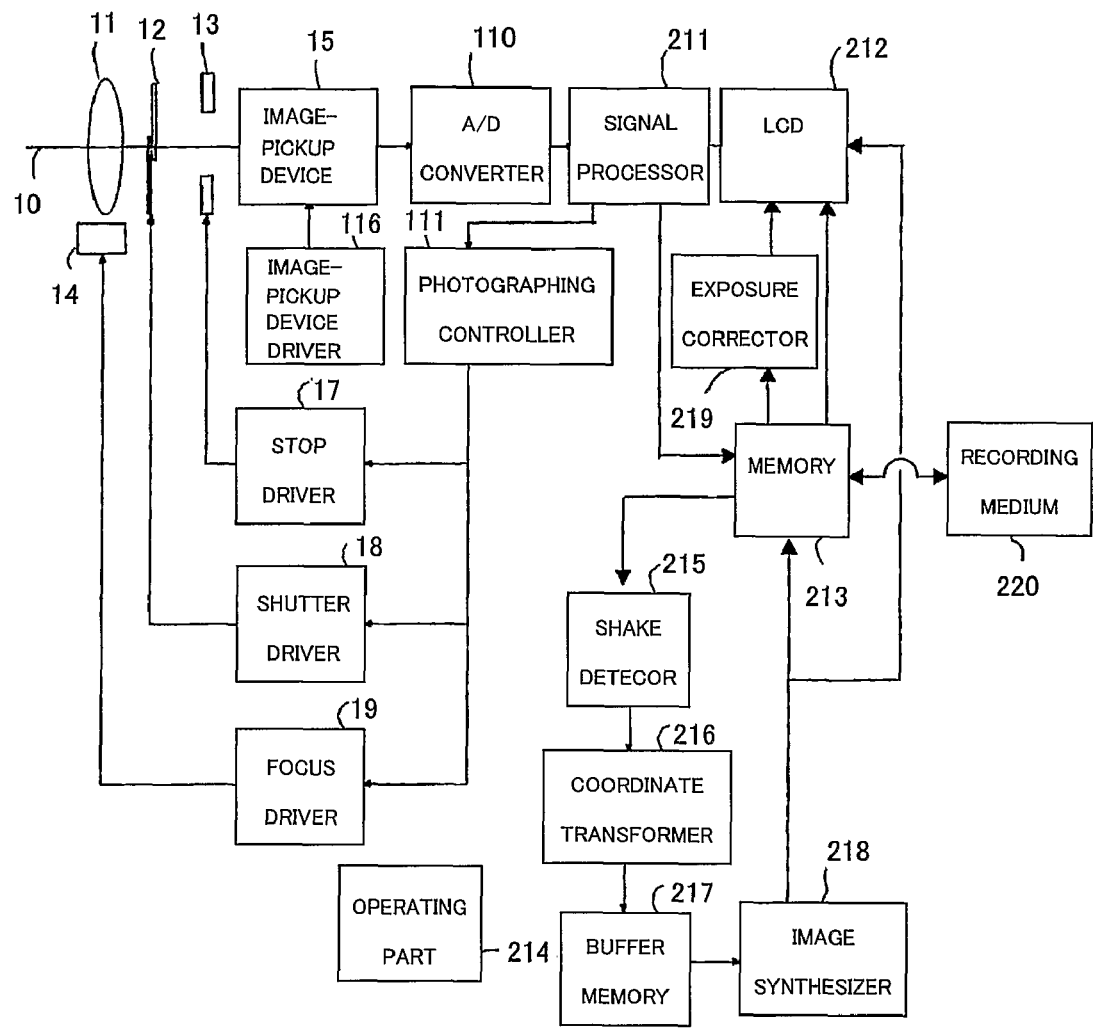
FIG. 1 is a block diagram of a digital camera according to one embodiment of the present invention.

FIG. 1 is a block diagram of a structure of a digital camera according to one embodiment of the present invention. In FIG. 1, 11 denotes a lens as part of an optical system detachably provided in the digital camera. The photographing light passes a shutter 12 through the lens 11, and images on an image-pickup device 15 while a stop 13 adjusts its light intensity. The image-pickup device 15 is a semiconductor CCD, such as a CMOS sensor and a CCD sensor.

The lens 11 is movable along an optical axis 10 by a focusing AF driving motor 14, and a focus driver 19 controls a driving amount of the focusing AF driving motor 14 for focusing. Although not shown, the lens 11 is a lens unit that has plural lenses, and the AF driving motor 14 varies an interval between two adjacent lenses for focusing. A stop driver 17 controls an aperture diameter of the stop 13. A shutter driver 18 controls opening and closing of the shutter 12. The stop 13 and the shutter 12 control the light intensity incident upon the image-pickup device 15.

More specifically, a photographing controller 111 controls actions of the focus driver 19, the stop driver 17, and the shutter driver 18. The photographing controller 111 provides photometry using an image signal from the image-pickup device 15 inputted from a signal processor 211, which will be described later, and determines, based on the result, the aperture diameter of the stop 13 and the opening time period of the shutter 12. In addition, the photographing controller 111 calculates an optimal focal point or set value through the focus driver 19, and controls operations of all the circuits and memories including the focus driver 19, the stop driver 17, and the shutter driver 18.

An A/D converter 110 converts an image signal outputted form the image-pickup device 15 into a digital signal, and inputs it into a signal processor 211. The signal processor 211 performs a predetermined signal process for the input image signal, such as formations of a brightness signal and a color signal, and generates a color image signal. The generated image signal is displayed, for example, on a LCD 211 that includes a liquid crystal panel on a rear surface of the digital camera and a driver for driving the liquid crystal panel. A memory 213 records the generated image signal. When a user views an image recorded in the memory 213, he presses, for example, a predetermined switch at a camera operating part 214, reads an image out of the memory 213, and displays it on the LCD 212.

A switch of the display modes at the operating part 214 enables a user to select a single image and plural thumbnails as in the known digital camera.

The above series of operations in a photographing mode assume a bright subject and need no shake compensation, because proper exposure is obtained with a short exposure time (referred to as a "normal photographing mode" hereinafter).

On the other hand, a dark subject needs a long exposure time period and subjects the image to camera shakes. Then, the user turns on or activates a shake compensation system in the operating part 214. The following operation is performed in this shake-compensation photographing mode.

When the user half-presses a release button (not shown) of the camera similar to the normal photographing mode, the photographing controller 111 provides the auto-focusing and photometry. Based on the photometry value, the photographing controller 111 determines a shutter speed (exposure time period) and a stop value in order to obtain a properly exposed image. The photographing controller 111 calculates a user's division of total exposure time period by the shutter speed that is unlikely to cause shakes, and finalizes the shutter speed and the stop value for each shot. Then, each photographing follows, but each image runs short of exposure.

In response to pressing of the release button by the user, the photographing controller 111 continuously takes the subject calculated times, and obtains plural images. When the exposure time period originally set for a single image is divided into plural shots, each image has a shorter exposure time period and runs short of exposure. This configuration provides images that are less influenced by the camera shakes during exposure because of the short exposure time period. The plural obtained images are synthesized into a single image with a proper exposure.

Even when the camera shake influence reduces due to the shortened exposure time of plural images, a slight offset may occur in the compositions among them due to the camera shakes of the continuous shots of plural images. A synthesis of these plural images is likely to blur the synthesized image.

Accordingly, when the user turns on a synthesis start switch in the operating part 214 at the arbitrary timing, the shake-compensation photographing mode starts the following synthesizing process after converting each shot image into a digital signal by the A/D converter 110, turning it into a color image signal by the signal processor 211, and storing it in the memory 213.

In order to distinguish from an image in the normal photographing mode, the following description refers to as a "divided image" an image obtained by dividing the exposure time period in the shake-compensation photographing mode, and as a "synthesized image" obtained by synthesizing plural divided images.

A shake detector 215 reads plural divided images stored in the memory 213, extracts common feature points among the divided images, and calculates a coordinate of a position of each divided image of this feature point. The feature point is set, for example, to an edge of a window in a building where there is a static thing, such as a building, in the background of the subject in the divided image.

A coordinate transformer 216 provides a coordinate transformation for divided images except for the first divided image based on the calculated position coordinate of the feature point of each divided image. As a result, the position coordinates of the feature points in plural divided images accord with each other. The first divided image and the other coordinate-transformed divided images are stored in a buffer memory 217. An image synthesizer 218 reads these divided images out of the buffer memory 217, and synthesizes them.

Thus obtained synthesized image is stored as a final recording-use image in a recording medium 220, such as a semiconductor memory and an optical disc, which is removable from the camera.

The conventional LCD 212 displays the synthesized image. However, when plural divided images are synthesized after photographing and the resultant synthesized image is displaced on the LCD 212, the taken images are not viewable while plural divided images are being taken. As a result, it is difficult to meet the user's request of a quick confirmation of a composition etc. in taking plural divided images.

The camera may not include the image synthesizer 218 unlike this embodiment, and another processor, such as a personal computer ("PC") may perform image processing.

Figure 2A:
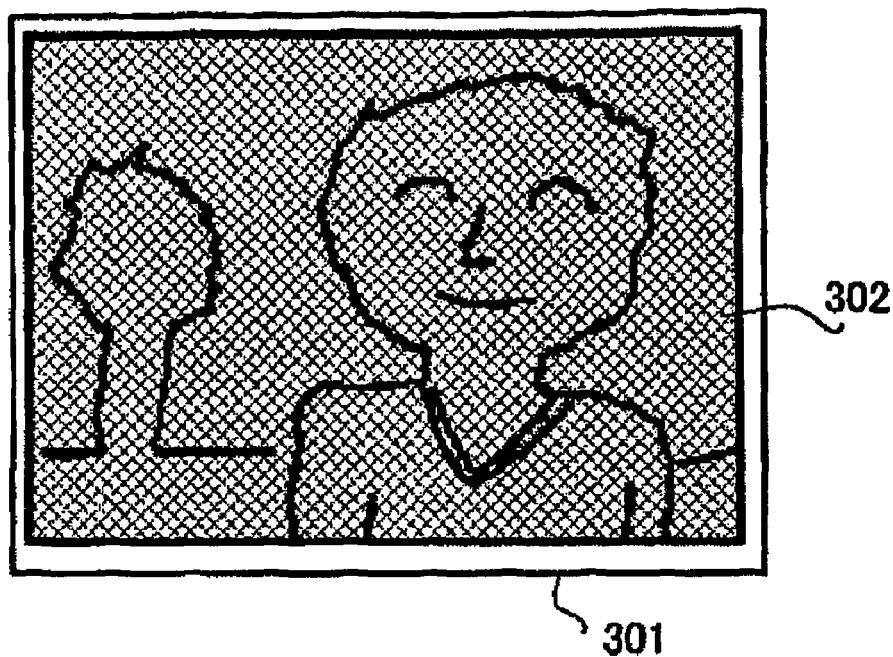
FIGS. 2A and 2B are schematic views of an image displaced on a LCD in the digital camera according to this embodiment.

As a solution for this problem, the digital camera of this embodiment generates a display-use image different from a recording-use image as follows:

FIG. 2A schematically shows an image having insufficient exposure on the LCD 212 in the normal photographing mode. In FIG. 2A, 301 denotes a display frame of the LCD 212, and 302 denotes a taken image. In the normal photographing mode in which a single shot generates a single image, the display frame 301 shows a large image obtained by the single shot. In FIG. 2A, half-tone dot meshing means the insufficient exposure.

Figure 2B:
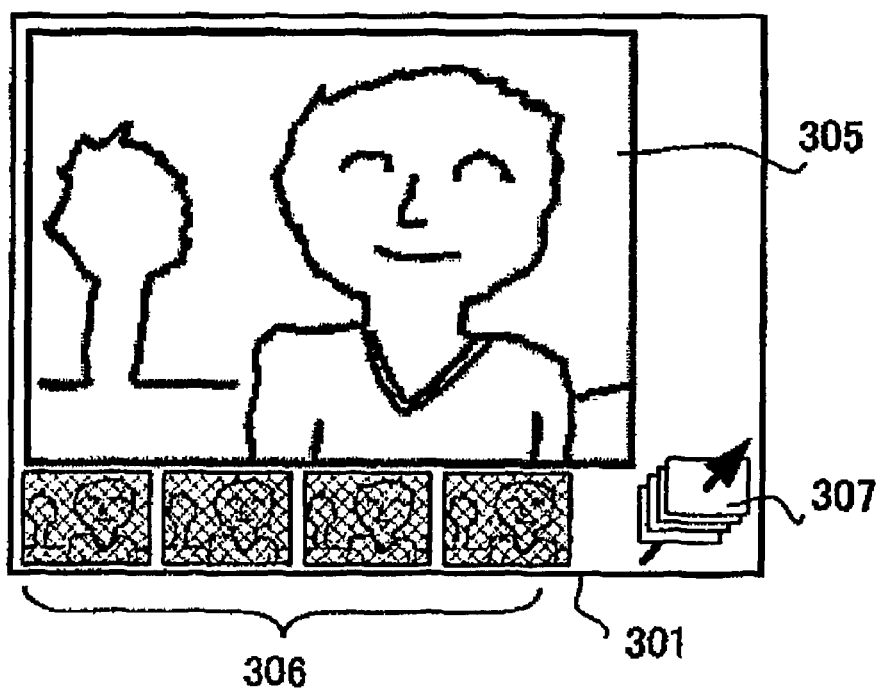

FIG. 2B schematically shows that four divided images are displayed in the shake-compensation photographing mode. Since each taken or divided image runs short of exposure in the shake-compensation photographing mode, the image when displayed runs short of exposure as shown in FIG. 2A, and it is difficult for a user to confirm the composition etc. Accordingly, four divided images are displayed as 306 under the display frame 301, and an exposure corrector 219 as an image generator performs image processing or exposure correction that adjusts the exposure for the first divided image (the same image as the leftmost image in the four images 306), generating a display-use image. The display-use image is displayed as a large image 305 in FIG. 2B.

More specifically, the exposure corrector 219 corrects exposure by varying the tone curve of the first divided image, amplifies the brightness and contrast, and generates a display-use image 305. Since the display-use image 305 is generated through an exposure correction only to the first divided image, image noises are amplified and the resultant image often becomes rough. However, the user can view a taken image and check the composition etc., in the shake-compensation photographing mode just after the first divided image is taken and before the images are synthesized.

In displaying an exposure-corrected divided image, as shown by 307, a mark or icon may be displayed which indicates that the current image is obtained through an exposure correction to one of plural taken images in the shake-compensation photographing mode. The exposure-corrected divided image does not have to be the first divided image, and may be one of the second or subsequent images that are determined to contain a relatively small amount of noises.

Figure 3A:
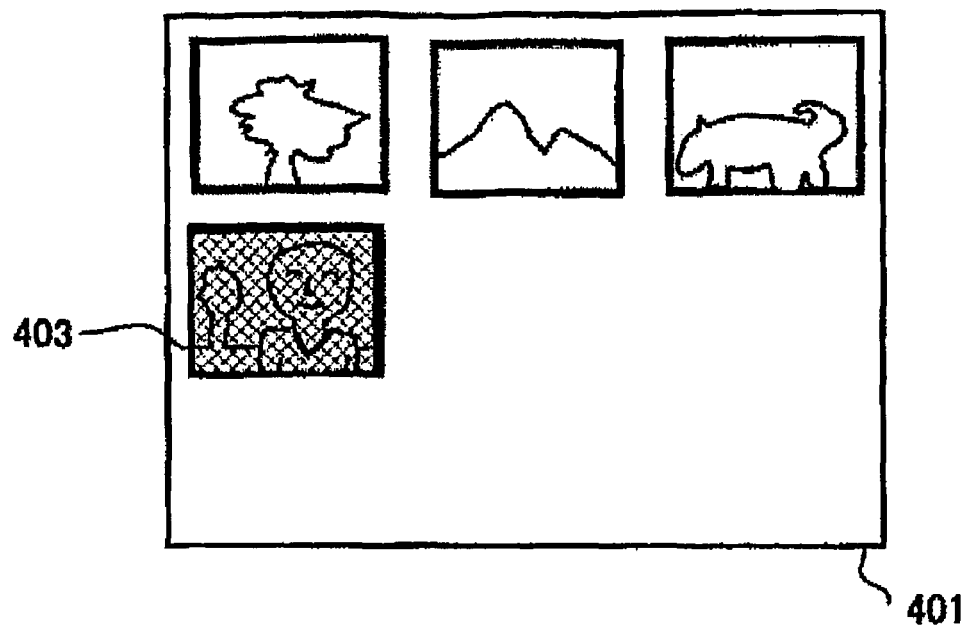
FIGS. 3A and 3B are schematic views of an image displaced on the LCD in the digital camera according to this embodiment.
Figure 3B:
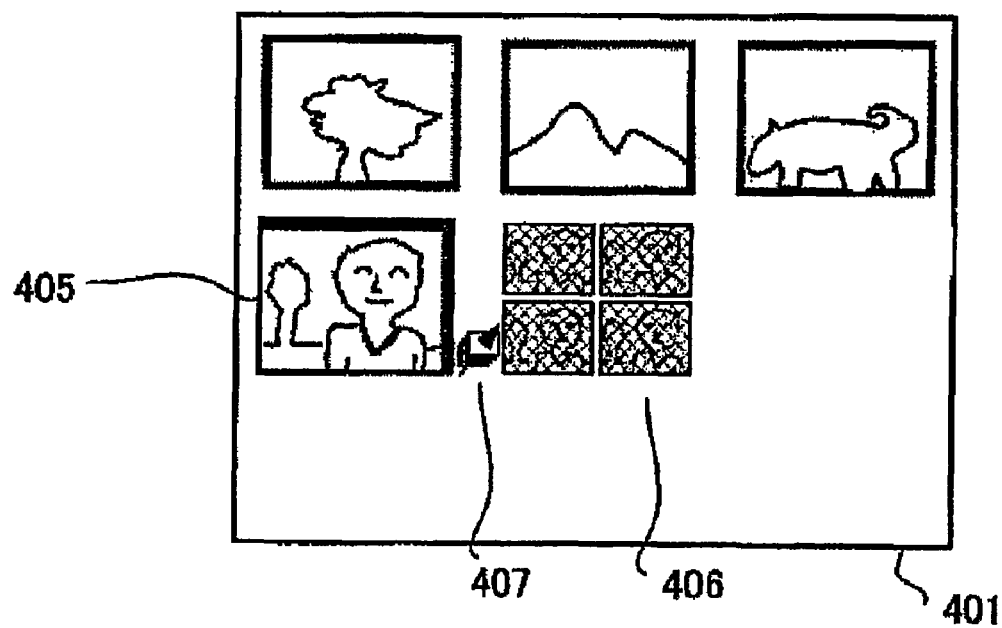

The above description addresses the LCD 212 that displays one large image. Referring now to FIGS. 3A and 3B, a description will be given of thumbnails of plural divided images stored in the memory 213. The thumbnail mode simultaneously displays plural small, taken images.

FIG. 3A schematically shows a thumbnail state of an image taken in the normal photographing mode. In FIG. 3A, 401 denotes a display frame of the LCD 212, and each taken image is thumbnailed in this frame 401. Therefore, the image taken with insufficient exposure is displayed at an insufficient exposure state like 403.

On the other hand, FIG. 3B schematically shows thumbnails including plural images taken by switching the normal photographing mode to the shake-compensation photographing mode. Assume that four divided images are taken in the shake-compensation mode. In FIG. 3B, 406 denotes thumbnails of four reduced, taken, divided images. Each of the thumbnailed divided images runs short of exposure.

The display-use image 405 that is obtained through an exposure correction to the first or second divided image by the exposure corrector 219 and the reduced, displayed and divided image are displayed at the same size as the thumbnail image taken in the normal photography mode.

In this case, the display-use image 405 contains amplified noises, as discussed above, but the noises are not conspicuous because the display-use image size is a small thumbnail size. Rather, an advantage that the user can easily confirm a taken image is significant. Even in this case, the display-use image 405 may display the icon that indicates that it is a divided image taken in the shake-compensation photographing mode.

Figure 4:
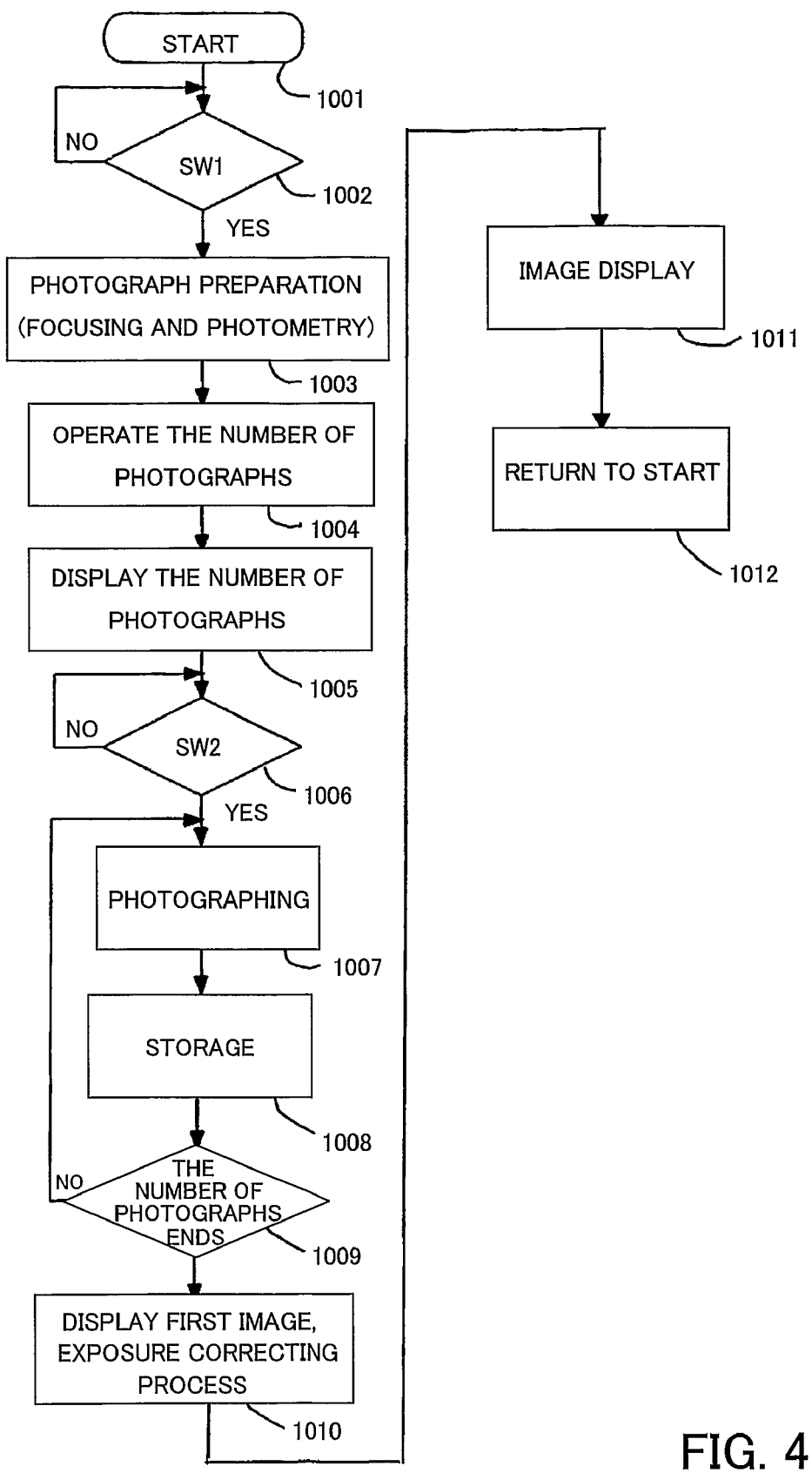
FIG. 4 is a flowchart showing an image displaying procedure on the LCD.

Referring to a flowchart shown in FIG. 4, a description will be given of an operation from photographing of plural divided images in the shake-compensation photographing mode to displaying the display-use image shown in FIG. 2B. This operation is executed in accordance with the computer program (image processing program) stored in the photographing controller 111 that includes a CPU.

The operation starts when a user selects the shake-compensation mode at the operating part 214 (step ("S" in short in FIG. 4) 1001). When the user half-presses a release button (SW1 ON) and starts photographing (autofocus ad photometry) (step 1002), the image-pickup device 15 photoelectrically converts the light (subject image) from the subject, and feeds an output to the signal processor 211. The photographing controller 111 moves the lens 11 by driving the AF driving motor 14 while detecting the contrast of the image, and provides autofocus by stopping the lens 11 at a position having the highest contrast. In parallel, the subject's brightness is calculated based on the image obtained from the image-pickup device 15 (step 1003).

Next, the number of divided images to be taken is calculated from the subject's brightness calculated in step 1003 (step 1004). For example, assume, as a result of measuring the subject's brightness, that the full opening of the stop 13 (e.g., with f2.8) and the exposure time period of ⅛ seconds of the shutter 12 are necessary to properly expose the subject. If the focal length is 30 mm when converted into a 35 mm film, the exposure time period that is unlikely to cause the image shakes is determined to be 1/32 seconds, because the exposure time period of ⅛ seconds is likely to cause camera and image shakes. Thereby, the exposure time period is quartered, and four photographs of divided images are determined.

When the number of divided images is determined, the number of photographs is displayed on the finder or LCD 212 of the camera, informing the user (step 1005).

Then, the standby mode continues until the user fully presses a release button (SW2). When the semi-press of the release button (SW1) is released during the standby, the procedure returns to the start (step 1001). Then, when the user fully presses the release button (SW2) and directs photographing, photographing of the first (cut) divided image starts (step 1007) and is recorded in the memory 213 (step 1008).

The photographing controller 111 repeats the operations of steps 1007 and 1008 until the number of divided images recorded in the memory 213 reaches the predetermined number (step 1009).

When all the divided images are recorded, the photographing controller 111 instructs the exposure controller 219 to perform the exposure correction, for example, to the first (cut) divided image (step 1010), and enables the exposure-corrected divided image to be displayed as a display-use image on the LCD 212, as shown in FIG. 2A (step 1011). Then, the procedure returns to the start for the next photographing (step 1012).

The above flowchart reads the first divided image and generates the display-use image, after shots of all the divided images end. However, for example, just after the first divided image is taken, the first divided image may be read out of the memory 213 for the exposure correcting process and for display even before shots of all the divided images do not ended. This configuration executes photographing and exposure correction process in parallel, and enables the exposure-corrected image to be displayed on the LCD 212 more quickly, although the digital camera's process burden becomes heavy.

Figure 5:
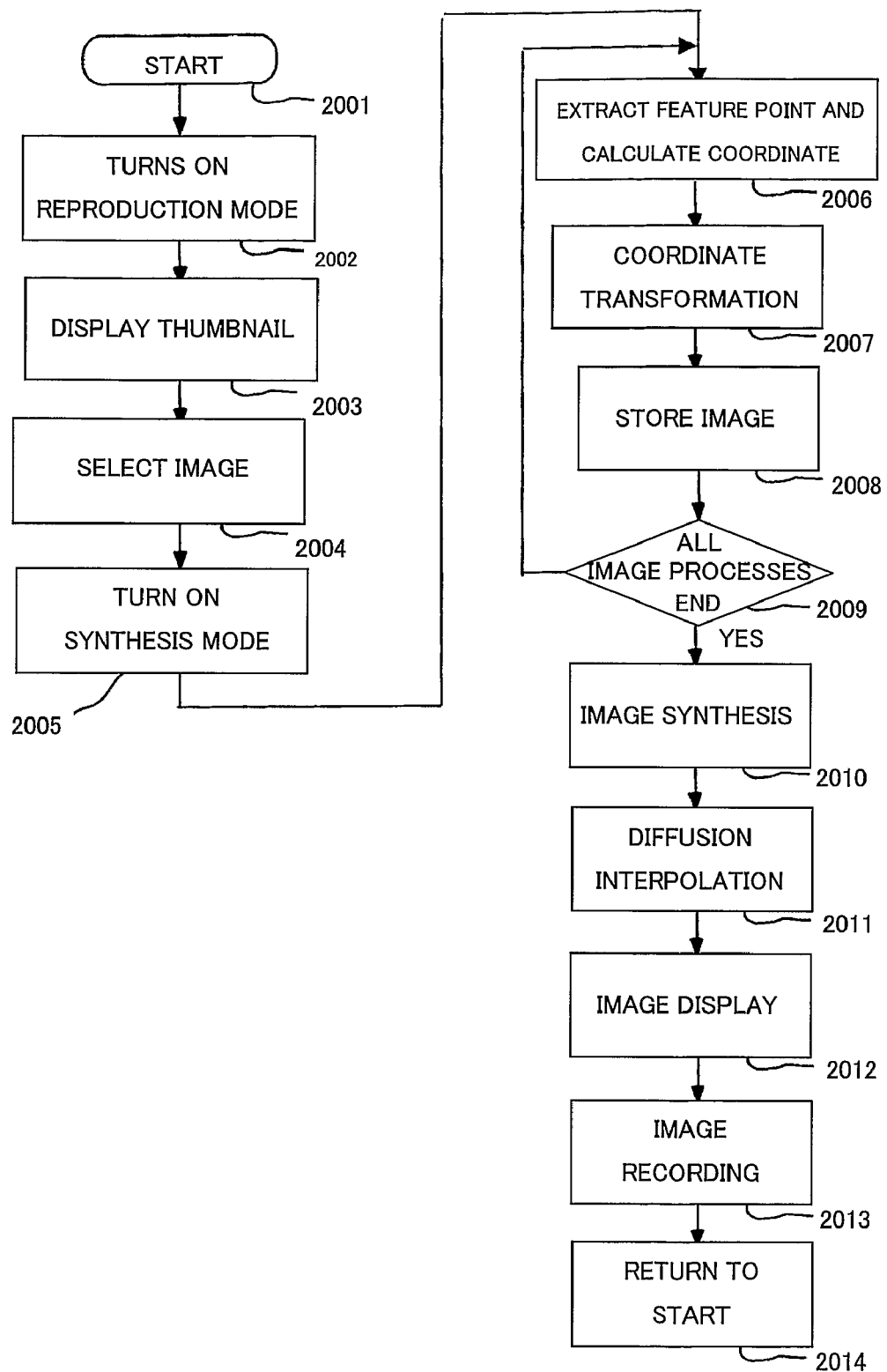
FIG. 5 is a flowchart showing an image synthesizing procedure in the digital camera of this embodiment.

Referring now to FIG. 5, a description will be given of an operation of generating a single image by synthesizing plural taken, divided images. This operation is also executed in accordance with the computer program (image synthesizing program) stored in the photographing controller 111. However, as discussed above, the computer program may be run in another processor, such as a PC.

After the operation starts (step 2001), the user turns on a reproduction mode switch in the operating part 214 (step 2002). In response, the photographing controller 111 generates thumbnails of the taken images from the memory 213, and enables them on the LCD 212, as shown in FIG. 3B (step 2003).

When the user selects the divided image taken in the shake-compensation mode among the thumb nailed, taken images, by the operation at the operating part 214 (step 2004), and turns on the synthesis start switch (step 2005), the first divided image is read out of the memory 213. In addition, the shake detector 215 extracts the feature point in the surrounding area of the divided image, and calculates the coordinate of the feature point's position (step 2006).

Next, the photographing controller 111 instructs the coordinate transformer 216 to provide a coordinate transformation of the divided images except for the first divided image (step 2007). More specifically, the coordinate transformation is such that the coordinate of the feature point of the first divided image overlaps the coordinate of the feature point of the other divided image.

The buffer memory 217 stores the first divided image and the coordinate-transformed divided image (step 2008).

The operation repeats from steps 2006 to 2008 until the coordinate transformations are completed for all of the divided images except the first image (step 2009). Thereby, the compositions of the second and subsequent divided images accord with the composition of the first divided image.

When the coordinate transformation ends for all of the divided images except for the first one, the photographing controller 111 instructs the image synthesizer 218 to perform an image synthesizing process (step 2010). This embodiment does not limit a specific approach of the image synthesizing process, but may add brightness information and color information to a pixel on the same coordinate position of each divided image. In this case, the random noises in each divided image reduce through weighted average.

When the synthesized image is thus generated, the image synthesizer 218 removes an area that does not exist in another divided image, near the edge of each divided image, or non-overlapping areas in all the divided images. The non-overlapping areas are caused by shifts of divided images from the composition due to shakes in photographing plural divided images. The removed synthesized image (with a smaller size) is diffusion-interpolated to the original size (step 2011), and displayed on the LCD 212. The diffusion-interpolated synthesized image is stored in the recording medium 220 (step 2013), and the procedure returns to the start.

In order to display the synthesized image, a display mode may be the normal photographing mode shown in FIG. 2A or the shake-compensation photographing mode shown in FIG. 2B. Each divided image stores, as tag information, information that each image is correlated.

As described above, this embodiment corrects exposure of a single image among the plural images before they are synthesized and generates a display-use image in a camera, such as a digital camera, which continuously takes plural images that run short of exposure and synthesizes the plural images into one image. Thereby, a user can confirm a composition of a taken image without waiting for a termination of the image synthesizing process and maintain the best moment to take a good picture.

INDUSTRIAL APPLICABILITY

Thus, the present invention can provide a camera that does not interrupt photography and can properly display a taken image in generating one exposed image from synthesizing plural images.

The invention claimed is:

1. A camera comprising:
   (a) a switch for switching a photographing mode and a reproduction mode;
   (b) an image taking part configured to sequentially take each of plural images, the image taking part taking all the plural images with a first exposure time period shorter than a second exposure time period to obtain a proper exposure for brightness of a subject;
   (c) a memory configured to sequentially store the plural images taken by the image taking part;
   (d) a synthesizing part configured to detect offsets among the plural images and to synthesize the plural images coordinate-transformed to correct the offsets detected among the plural images, the synthesis process being performed after changing from the photographing mode to the reproduction mode;
   (e) an exposure correction part configured to perform image processing to a proper exposure on one image among the plural images stored in the memory;
   (f) a displaying part configured to display an image; and
   (g) a display control part configured to change display images, the display control part displaying the image image-processed by the exposure correction part on the displaying part during the photographing mode and after changing from the photographing mode to the reproduction mode until the synthesis process in the synthesizing part is completed, and displaying the synthesized image on the displaying part after the synthesis process is completed.

2. A camera according to claim 1, wherein the one image which is image-processed by the exposure correction part is an earliest taken image among the plural images.

3. A camera according to claim 1, wherein the exposure correction part amplifies brightness of each of pixels constituting the one image, thereby performing the image processing.

4. A camera according to claim 1, wherein the displaying part displays, together with the one image-processed image, the plural images with a smaller size than that of the one image-processed image.

5. A camera according to claim 1, wherein the displaying part displays, together with the one image-processed image, an icon showing that the one image-processed image has been generated from one of the plural images.

6. A camera comprising:
   (a) a switch for switching a photographing mode and a reproduction mode;
   (b) an image taking part configured to sequentially take each of plural images, the image taking part taking all the plural images with a first exposure time period shorter than a second exposure time period to obtain a proper exposure for brightness of a subject;
   (c) a memory configured to sequentially store the plural of images taken by the image taking part;
   (d) a synthesizing part configured to detect offsets among the plural images and to synthesize the plural images coordinate-transformed to correct the offsets detected among the plural images, the synthesis process being performed after changing from the photographing mode to the reproduction mode;
   (e) an exposure correction part configured to perform image processing to a proper exposure on one image among the plural images stored in the memory;
   (f) a displaying part configured to display an image; and
   (g) a display control part configured to display the image image-processed by the exposure correction part on the displaying part during the photographing mode and after changing from the photographing mode to the reproduction mode until the synthesis process in the synthesizing part is completed, and displaying the synthesized image on the displaying part after the synthesis process is completed.

7. A camera according to claim 6, wherein the one image which is image-processed by the exposure correction part is an earliest taken image among the plural images.

8. A camera according to claim 6, wherein the exposure correction part amplifies brightness of each of pixels constituting the one image, thereby performing the image processing.

9. A camera according to claim 6, wherein the displaying part displays, together with the one image-processed image, the plural images with a smaller size than that of the one image-processed image.

10. A camera according to claim 6, wherein the displaying part displays, together with the one image-processed image, an icon showing that the one image-processed image has been generated from one of the plural images.

11. A system comprising a camera that takes plural images and an image processing apparatus that reproduces an image, wherein the camera comprising;
   (a) an image taking part configured to sequentially take each of the plural images, the image taking part taking all the plural images with a first exposure time period shorter than a second exposure time period to obtain a proper exposure for brightness of a subject;

(b) a memory configured to sequentially store at least one of the plural of images taken by the image taking part;
(c) an exposure correction part configured to perform image processing to a proper exposure on one image among the plural images stored in the memory;
(d) a displaying part configured to display an image;
(e) a display control part configured to display the image image-processed by the exposure correction part on the displaying part;
wherein the image processing apparatus comprising;
(f) a synthesizing unit configured to detect offsets among the plural images and to synthesize the plural images coordinate-transformed to correct the offsets detected among the plural images, the synthesis process being performed after the camera takes the plural images;
(g) a display configured to display an image; and
(h) a control unit configured to display the image image-processed by the exposure correction part on the display until the synthesis process in the synthesizing unit is completed, and displaying the synthesized image on the display after the synthesis process is completed.

12. A camera according to claim 11, wherein the one image which is image-processed by the exposure correction part is an earliest taken image among the plural images.

13. A camera according to claim 11, wherein the control unit amplifies brightness of each of pixels constituting the one image, thereby performing the image processing.

14. A camera according to claim 11, wherein the displaying part displays, together with the one image-processed image, the plural images with a smaller size than that of the one image-processed image.

15. A camera according to claim 11, wherein the displaying part displays, together with the one image-processed image, an icon showing that the one image-processed image has been generated from one of the plural images.

* * * * *